United States Patent
Chen

(10) Patent No.: US 12,305,432 B2
(45) Date of Patent: May 20, 2025

(54) DOOR HANDLE ASSEMBLY FOR VEHICLE

(71) Applicant: Illinois Tool Works Inc., Glenview, IL (US)

(72) Inventor: Bin Chen, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 390 days.

(21) Appl. No.: 18/090,219

(22) Filed: Dec. 28, 2022

(65) Prior Publication Data

US 2023/0228133 A1 Jul. 20, 2023

(30) Foreign Application Priority Data

Jan. 20, 2022 (CN) .......................... 202220151285.9

(51) Int. Cl.
*E05B 85/10* (2014.01)
*B60J 5/04* (2006.01)
*E05B 85/18* (2014.01)

(52) U.S. Cl.
CPC ............ *E05B 85/107* (2013.01); *E05B 85/18* (2013.01); *B60J 5/0468* (2013.01); *E05B 85/103* (2013.01)

(58) Field of Classification Search
CPC ...... E05B 85/103; E05B 85/107; E05B 85/18; E05B 5/00
See application file for complete search history.

(56) References Cited

U.S. PATENT DOCUMENTS

| | | | | |
|---|---|---|---|---|
| 3,967,844 | A * | 7/1976 | Torii | E05B 85/18 |
| | | | | 292/210 |
| 4,588,219 | A * | 5/1986 | Kobayashi | E05B 85/18 |
| | | | | 292/DIG. 31 |
| 6,923,481 | B2 * | 8/2005 | Bruderick | E05B 81/76 |
| | | | | 292/DIG. 31 |
| 7,568,743 | B2 * | 8/2009 | Villagrasa | E05B 85/10 |
| | | | | 292/DIG. 31 |
| 11,214,994 | B2 * | 1/2022 | Han | E05B 81/90 |
| 11,492,822 | B2 * | 11/2022 | Schnetter | E05B 81/00 |

(Continued)

FOREIGN PATENT DOCUMENTS

CN  105464492 A * 4/2016
CN  105507699 A * 4/2016

(Continued)

*Primary Examiner* — Kristina R Fulton
*Assistant Examiner* — Faria F Ahmad
(74) *Attorney, Agent, or Firm* — McAndrews, Held & Malloy, Ltd.

(57) ABSTRACT

A door handle assembly for a vehicle having a handle holder, a handle, a slider and an actuator. The handle holder is provided with a rotation shaft extending in a length direction of the vehicle. The handle is connected to the rotation shaft and configured to be pivotable about an axis of the rotation shaft to move between a retracted position and a deployed position. The slider is linearly movably arranged in the handle holder and configured to, by its forward movement in a first direction, bring the handle to rotate from the retracted position to the deployed position, and to be able to move backward in a second direction opposite to the first direction, so that the handle is rotatable from the deployed position to the retracted position. The actuator is configured to drive the slider to move forward in the first direction and backward in the second direction.

10 Claims, 6 Drawing Sheets

(56) References Cited

U.S. PATENT DOCUMENTS

| | | | |
|---|---|---|---|
| 11,499,352 B2 * | 11/2022 | Guerin | E05B 85/107 |
| 11,739,572 B2 | 8/2023 | Kuniyil | |
| 2002/0121786 A1 * | 9/2002 | Meinke | E05B 77/42 |
| | | | 292/336.3 |
| 2017/0159333 A1 | 6/2017 | Beck | |
| 2019/0234122 A1 * | 8/2019 | Löw | E05B 85/103 |
| 2020/0102773 A1 * | 4/2020 | Sobecki | E05B 85/107 |
| 2020/0115935 A1 * | 4/2020 | Han | E05B 81/90 |
| 2020/0354996 A1 | 11/2020 | Bresser | |
| 2021/0087862 A1 * | 3/2021 | Guerin | E05B 81/06 |
| 2021/0156178 A1 * | 5/2021 | Heyduck | E05B 81/42 |
| 2021/0172218 A1 * | 6/2021 | Velicanin | E05B 85/107 |
| 2021/0363793 A1 * | 11/2021 | Rhein | E05B 81/90 |
| 2022/0195762 A1 * | 6/2022 | Toyama | E05B 85/16 |
| 2022/0282533 A1 * | 9/2022 | Schütz | E05B 81/06 |
| 2023/0133814 A1 | 5/2023 | Kuniyil | |
| 2023/0332443 A1 * | 10/2023 | Jung | E05B 85/103 |
| 2025/0020003 A1 * | 1/2025 | Kim | E05B 85/107 |

FOREIGN PATENT DOCUMENTS

| | | | | |
|---|---|---|---|---|
| CN | 111101786 B | | 1/2024 | |
| DE | 102008019335 A1 * | 10/2008 | | E05B 85/107 |
| DE | 102011001001 A1 * | 6/2012 | | E05B 85/103 |
| DE | 202014010524 U1 * | 4/2016 | | B60Q 1/2669 |
| DE | 102017101417 A1 * | 7/2018 | | E05B 81/16 |
| DE | 102017101421 A1 * | 7/2018 | | E05B 81/90 |
| DE | 102018121432 A1 * | 3/2020 | | E05B 77/04 |
| GB | 2536669 B * | 3/2018 | | B60J 5/0415 |
| JP | S60138189 A * | 7/1985 | | |
| WO | 2020048858 A1 | 3/2020 | | |

* cited by examiner

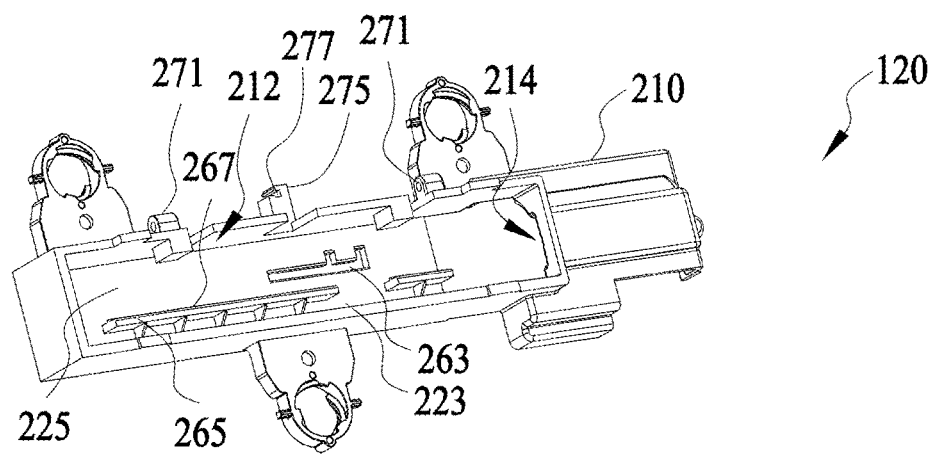
Fig. 2
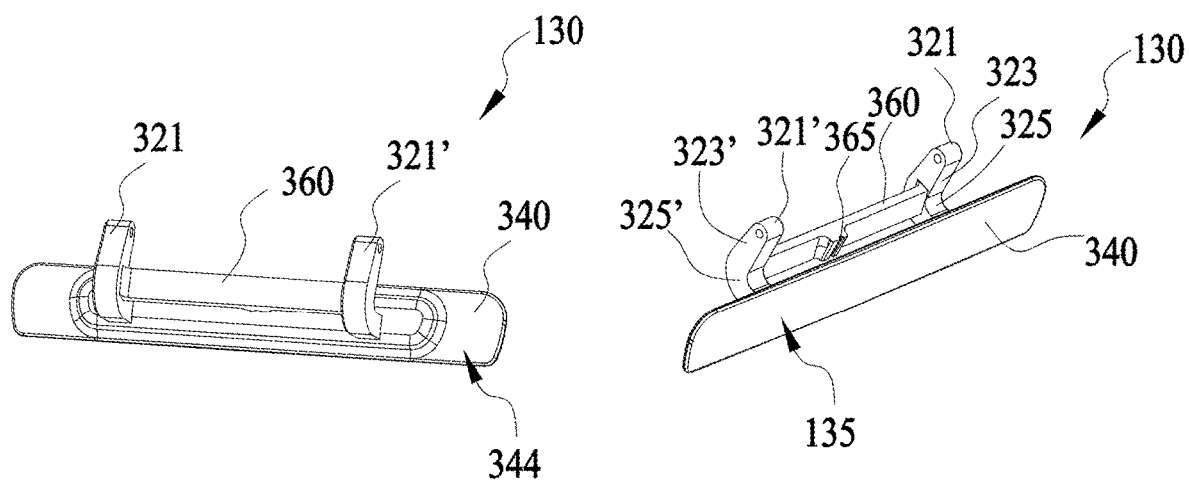
Fig. 3A
Fig. 3B

DOOR HANDLE ASSEMBLY FOR VEHICLE

CROSS-REFERENCE

The present application claims the benefit of Chinese Patent Application No. 202220151285.9 filed Jan. 20, 2022, titled "Door Handle Assembly for Vehicle," the contents of which are hereby incorporated by reference.

TECHNICAL FIELD

Embodiments of the present disclosure generally relate to a door handle assembly for a vehicle, and more particularly, to a door handle assembly having a concealed or semi-concealed door handle.

BACKGROUND

A concealed or semi-concealed door handle for a vehicle is in a retracted position when idle, so as to keep an outer surface of the door handle substantially flush with the surface of a sheet metal outside a vehicle door, so that the door handle is in a concealed or semi-concealed state. When use is desired, the door handle needs to be moved from the retracted position to an deployed position, so that an operator's hand can grip or operate the door handle to perform a door opening or unlocking operation through the door handle.

SUMMARY

The present disclosure relates generally to a door handle assembly for a vehicle, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 2 is a perspective view of a handle holder in FIG. 1B.

FIG. 3A is a perspective view of a handle in FIG. 1A as seen from back to front.

FIG. 3B is a perspective view of the handle of FIG. 1A as seen from front to back.

DETAILED DESCRIPTION

Figure 1A:
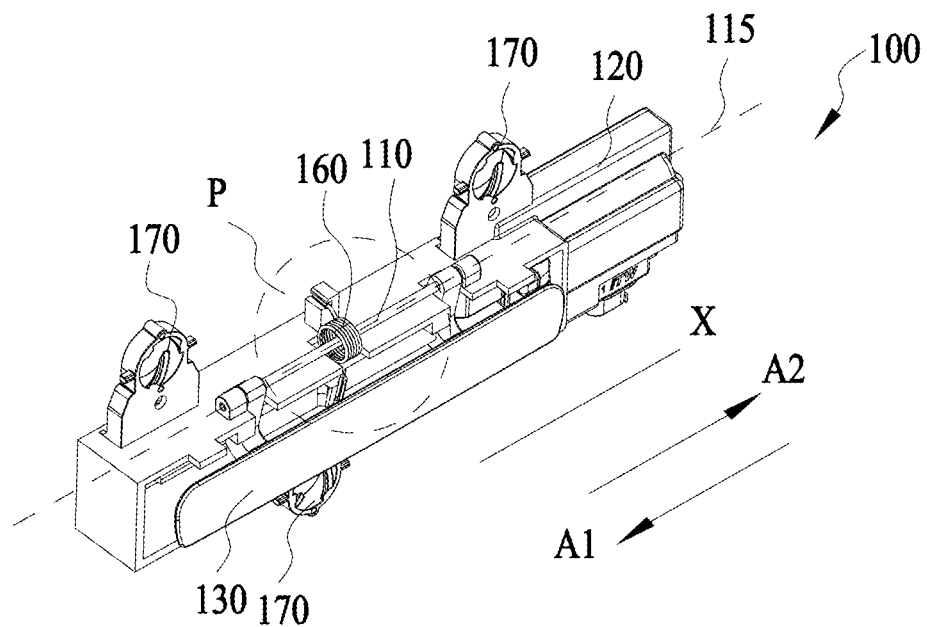
FIG. 1A is a perspective view of a door handle assembly for a vehicle according to an embodiment of the present disclosure.

Various specific embodiments of the present disclosure are described below with reference to the accompanying drawings which constitute part of this description. It is to be understood that although the terms indicating orientations, such as "front", "rear", "upper", "lower", "left", "right", "top" and "bottom", are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure may be arranged in different directions, these terms indicating directions are only illustrative and should not be considered as limitations.

Embodiments of the present disclosure provide a door handle assembly for a vehicle. A handle of the door handle assembly is a concealed or semi-concealed handle, and the door handle assembly automatically makes a door handle deploy and retract so that the door handle is switched between a use state and an idle state. In one example, the present disclosure provides a door handle assembly for a vehicle, comprising: a handle holder, a handle, a slider and an actuator. The handle holder is provided with a rotation shaft extending in a length direction of the vehicle. The handle is connected to the rotation shaft and configured to be pivotable about an axis of the rotation shaft to move between a retracted position and a deployed position. The slider is linearly movably arranged in the handle holder and configured to bring the handle to rotate from the retracted position to the deployed position by its forward movement in a first direction, and to be able to move backward in a second direction opposite to the first direction, so that the handle is rotatable from the deployed position to the retracted position. The actuator is configured to drive the slider to move forward in the first direction and backward in the second direction.

According to the door handle assembly described above, the handle comprises a handle grip portion and a pair of connecting arms connected at a rear side of the handle grip portion, the handle grip portion being connected to the rotation shaft via the pair of connecting arms. The slider comprises a pair of driving surfaces provided on a front side of the slider, the pair of driving surfaces being configured to respectively drive the pair of connecting arms so as to rotate the handle from the retracted position to the deployed position.

According to the door handle assembly described above, each of the pair of driving surfaces gradually extends away from the handle in the first direction.

According to the door handle assembly described above, each of the pair of driving surfaces is an inclined surface.

According to the door handle assembly described above, the door handle assembly further comprises a spring having a first end connected to the handle holder and a second end connected to the handle, the spring being configured to rotate the handle from the deployed position to the retracted position by a restoring force thereof.

According to the door handle assembly described above, the handle further comprises a blocking piece disposed between the pair of connecting arms, wherein the second end of the spring is connected to the blocking piece.

According to the door handle assembly described above, the handle holder is provided with a guide groove therein. The slider comprises a guide provided on a rear side of the slider, and the guide is configured to be movable in the guide groove such that the slider is linearly movably provided in the handle holder.

According to the door handle assembly described above, the handle holder is further provided with a supporting platform, the supporting platform being located below the guide groove and having a support surface extending substantially parallel to the guide groove to support the slider when the slider moves.

According to the door handle assembly described above, the first direction and the second direction are parallel to the length direction of the vehicle.

According to the door handle assembly described above, the actuator comprises a driving shaft, the driving shaft being connected to the slider to drive the slider to move forward in the first direction and backward in the second direction.

Figure 1B:
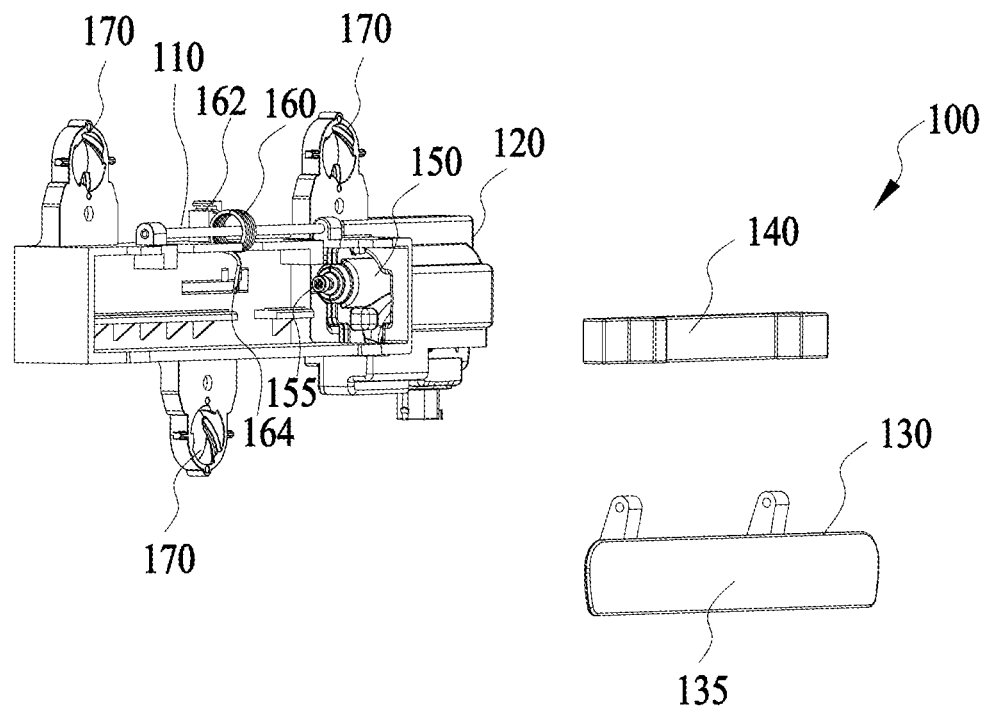
FIG. 1B is a partially exploded view of the door handle assembly shown in FIG. 1A.

FIGS. 1A and 1B show an overall structure of a door handle assembly 100 for a vehicle according to an embodiment of the present disclosure. FIG. 1A is a perspective view of the door handle assembly 100, and FIG. 1B is a partially exploded view of the door handle assembly 100. As shown in FIGS. 1A and 1B, the door handle assembly 100 includes a handle holder 120 and a handle 130, and a rotation shaft 110 for rotatably connecting the handle 130 to the handle holder 120. The handle 130 has a retracted position (idle state) and a deployed position (use state), and the handle 130 is moved between the retracted position and the deployed position by rotation. The door handle assembly 100 further includes an actuator 150 and a slider 140 for driving the handle 130 to rotate from the retracted position to the deployed position, and a spring 160 for causing the handle 130 to rotate from the deployed position to the retracted position. The door handle assembly 100 further includes a plurality of mounting portions 170 arranged on the handle holder 120 for mounting the door handle assembly 100 on an inner side of a sheet metal of a vehicle door. When the door handle assembly 100 is mounted in place on the sheet metal of the vehicle door, an outside surface 135 of the handle 130 in the retracted position is substantially flush with an outer surface of the vehicle door.

As still shown in FIGS. 1A and 1B, the rotation shaft 110 is provided on the handle holder 120 and extends along a length direction X of the vehicle, the rotation shaft 110 having an axis 115. The handle 130 is connected to the rotation shaft 110 and is able to rotate about the axis 115 of the rotation shaft 110, so that the handle 130 may rotate relative to the handle holder 120. The spring 160 is a torsion spring which is disposed around the rotation shaft 115. A first end 162 and a second end 164 of the spring 160 are connected to the handle holder 120 and the handle 130, respectively. The actuator 150 includes a driving shaft 155, the driving shaft 155 being connected to the slider 140. The actuator 150 is a linear actuator that outputs a linear driving force through the driving shaft 155. The slider 140 is linearly movably arranged in the handle holder 120 and may move forward in a first direction A1 and move backward in a second direction A2 opposite to the first direction A1. The first direction A1 and the second direction A2 are substantially parallel to the length direction X of the vehicle. The forward movement and backward movement of the slider 140 are driven by the actuator 150, and the forward movement of the slider 140 brings the handle 130 to rotate from the retracted position to the deployed position. The driving shaft 155 of the actuator 150 can gradually extend outwardly to push the slider 140 forward. During the rotation of the handle 130 from the retracted position to the deployed position, the spring 160 is deformed under force, thereby accumulating a restoring force. Therefore, when the driving shaft 155 of the actuator 150 is retracted inwardly to drive the slider 140 to be retracted along the second direction A2, the handle 130 is no longer subjected to the driving force applied by the slider 140, so that the handle can move from the deployed position to the retracted position under the restoring force of the spring 160.

FIG. 2 is a perspective view of the handle holder 120 in FIG. 1B. As shown in FIG. 2, the handle holder 120 includes a body portion 210, the body portion 210 being provided with a first chamber 212 for accommodating the slider 140 and a second chamber 214 for accommodating the actuator 150. The first chamber 212 and the second chamber 214 are arranged side by side along an X direction, and communicate with each other, so that the driving shaft 155 of the actuator 150 can extend from the second chamber 214 into the first chamber 212, thereby pushing the slider 140 to move. The first chamber 212 includes an opening portion 223 facing the handle 130 and a bottom portion 225 disposed opposite the opening portion 223. A portion of the handle 130 enters the first chamber 212 from the opening portion 223 to contact the slider 140 located in the first chamber 212.

The handle holder 120 includes a guide groove 263 provided on the bottom portion 225 of the first chamber 212, the guide groove 263 being used for guiding the linear movement of the slider 140. The guide groove 263 extends along the length direction X of the vehicle and extends through the bottom portion 225 of the first chamber 212. The handle holder 120 further includes a supporting platform 265 provided in the first chamber 212, the supporting platform 265 being connected to the bottom portion 225 of the first chamber 212 and located below the guide groove 263. The supporting platform 265 has a support surface 267 extending substantially parallel to the guide groove 263 to support the slider 140 when the slider 140 moves along the guide groove 263.

The handle holder 120 includes a pair of rotation shaft mounting portions 271, the pair of rotation shaft mounting portions 271 being spaced apart from each other by a distance and located above the first chamber 212. Both ends of the rotation shaft 110 are respectively supported by the pair of rotation shaft mounting portions 271 to mount the rotation shaft 110 between the pair of rotation shaft mounting portions 271. The handle holder 120 further includes a spring mounting portion 275, the spring mounting portion 275 being located above the first chamber 212 and located between the pair of rotation shaft mounting portions 271. The spring mounting portion 275 is provided with a limit groove 277 for accommodating the first end 162 of the spring 160.

FIGS. 3A and 3B show a specific structure of the handle 130 in FIG. 1B, wherein FIG. 3A is a perspective view of the handle 130 as seen from back to front, and FIG. 3B is a perspective view of the handle 130 as seen from front to back. As shown in FIGS. 3A and 3B, the handle 130 includes a handle grip portion 340 and a pair of connecting arms 321, 321', the pair of connecting arms 321, 321' being connected to a rear side 344 of the handle grip portion 340 to connect the handle grip portion 340 to the rotation shaft 110. The pair of connecting arms 321, 321' are spaced apart by a distance along the length direction X of a vehicle body. Each of the connecting arms 321, 321' is generally L-shaped and includes a long arm portion 323, 323' and a short arm portion 325, 325' connected with each other, wherein the long arm portion 323, 323' extends substantially parallel to the handle grip portion 340 in a height direction of the vehicle, and the short arm portion 325, 325' extends substantially perpendicular to the handle grip portion 340 in a width direction of the vehicle. The slider 140 drives the handle 130 to rotate by directly pushing the long arm portions 323, 323' of the connecting arms 321, 321'. The handle 130 further includes a blocking piece 360 disposed between the pair of connecting arms 321, 321', the blocking piece 360 being connected to the pair of connecting arms 321, 321'. The second end 164 of the spring 160 is connected to the blocking piece 360. A limit groove 365 for accommodating the second end 164 of the spring 160 is provided on a side of the blocking piece 360 facing the handle grip portion 340.

Figure 4:
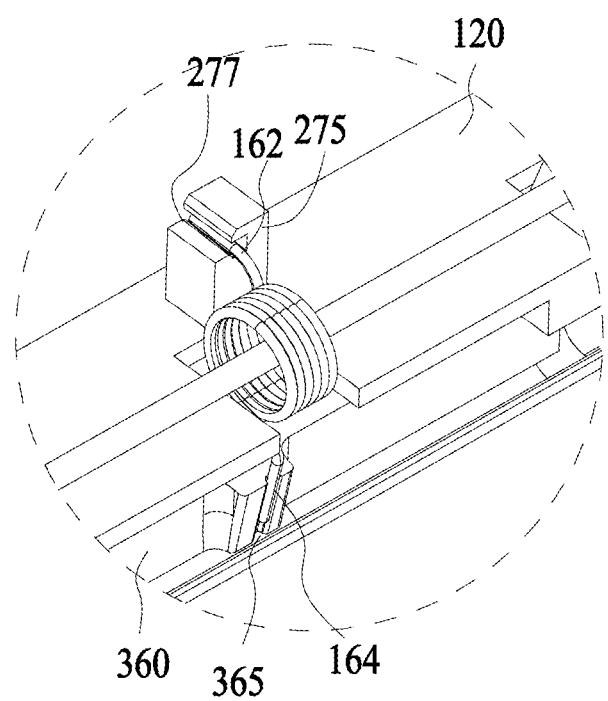
FIG. 4 is a partially enlarged view of a portion enclosed by the dashed line in FIG. 1A.

FIG. 4 is a partially enlarged view of a portion P enclosed by the dashed line in FIG. 1A for showing a specific structure for connecting the spring 160 with the handle 130 and the handle holder 120. As shown in FIG. 4, the first end 162 of the spring 160 is inserted into the limit groove 277 of the spring mounting portion 275 on the handle holder 120, and the second end 164 of the spring 160 is inserted into the limit groove 365 of the blocking piece 360 of the handle 130, whereby the spring 160 is connected to the handle 130 and the handle holder 120, respectively. When the handle 130 is in the retracted position, the spring 160 is in a free state. As the handle 130 rotates from the retracted position to the deployed position, the spring 160 is gradually deformed by force, thus gradually accumulating the restoring force. The restoring force may be used for returning the handle 130 from the deployed position to the retracted position.

Figure 5A:
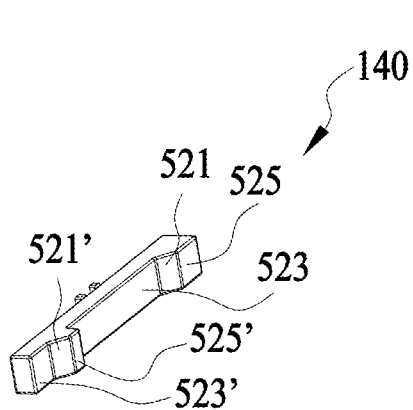
FIG. 5A is a perspective view of a slider in FIG. 1B as seen from front to back.
Figure 5B:
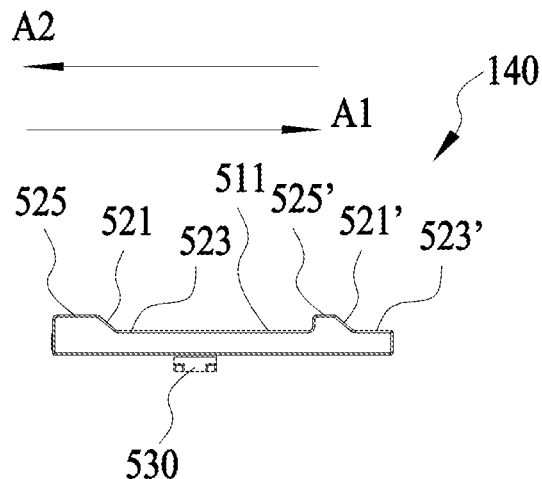
FIG. 5B is a top view of the slider in FIG. 5A.
Figure 5C:
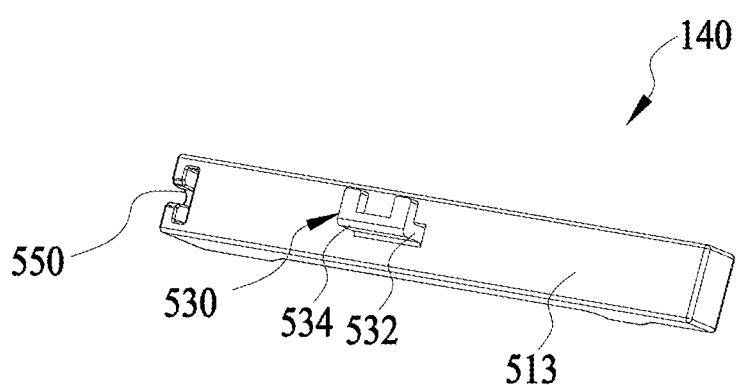
FIG. 5C is an enlarged perspective view of the slider in FIG. 5A as seen from back to front.

FIGS. 5A to 5C show a specific structure of the slider 140 in FIG. 1B, wherein FIG. 5A is a perspective view of the slider 140 as seen from front to back, FIG. 5B is a top view of the slider 140, and FIG. 5C is an enlarged perspective view of the slider 140 as seen from back to front. As shown in FIGS. 5A to 5C, the slider 140 is generally elongated and includes a front side 511 facing the handle 130 and a rear side 513 opposing to the front side 511. The slider 140 includes a pair of driving surfaces 521, 521' located on the front side 511, the driving surfaces 521, 521' being used for driving the pair of connecting arms 321, 321' of the handle 130, respectively. The slider 140 further includes a pair of release surfaces 523, 523' and a pair of retaining surfaces 525, 525' located on the front side 511. In a forward direction (i.e., the first direction A1) of the slider 140, the pair of release surfaces 523, 523' are respectively located downstream of the pair of driving surfaces 521, 521' and are respectively connected with the pair of driving surfaces 521, 521', while the pair of retaining surfaces 525, 525' are respectively located upstream of the pair of driving surfaces 521, 521' and are respectively connected with the pair of driving surfaces 521, 521'.

The driving surfaces 521, 521' are inclined surfaces extending obliquely with respect to the movement direction of the slider. In the forward direction (i.e., the first direction A1) of the slider 140, the driving surfaces 521, 521' gradually extend away from the handle 130. The pair of release surfaces 523, 523' and the pair of retaining surfaces 525, 525' each extend substantially parallel to the movement direction of the slider 140. Thus, the pair of release surfaces 523, 523' are connected with the lowest points of the pair of driving surfaces 521, 521', respectively, while the pair of retaining surfaces 525, 525' are connected with the highest points of the pair of driving surfaces 521, 521', respectively. The driving surfaces 521, 521', the release surfaces 523, 523' and the retaining surfaces 525, 525' cooperate to effect switching of the handle 130 between the retracted position and the deployed position. When the connecting arms 321, 321' of the handle 130 abut against the release surfaces 523, 523', the handle 130 is in the retracted position. When the connecting arms 321, 321' of the handle 130 abut against the driving surfaces 521, 521' and move along the driving surfaces 521, 521' with respect to the slider 140 toward the retaining surfaces 525, 525', the handle 130 is able to gradually move away from the retracted position and toward the deployed position. When the connecting arms 321, 321' of the handle 130 abut against the retaining surfaces 525, 525', the handle 130 is in the deployed position.

The slider 140 further includes a guide 530 provided on the rear side 513 thereof, the guide 530 being configured to be inserted into the guide groove 263 of the handle holder 120 and to be movable along the guide groove 263 such that the handle 130 is linearly movable in the handle holder 120. The guide 530 is formed substantially in the shape of a hook, which includes a guide portion 532 and a hook portion 534. The guide portion 532 is accommodated in the guide groove 263 of the handle holder, and the hook portion 534 passes through the guide groove 263 to hook the guide 530 onto the handle holder 120, thereby enabling the linear movement of the handle 130 in the handle holder 120 more stable.

The slider 140 further includes a connecting portion 550 at an end thereof close to the actuator 150 for connecting the slider 140 to the actuator 150. The connecting portion 550 is in the shape of a pocket, an end of the driving shaft 155 of the actuator 150 is in the shape of a flange, and the pocket-shaped connecting portion 550 is able to accommodate the flange-shaped end of the driving shaft 155. Thus, the driving shaft 155 of the actuator 150 is connected to the slider 140, so that the driving shaft 155 is able to drive the slider 140 to move forward along the first direction A1 and backward along the second direction A2.

Figure 6A:
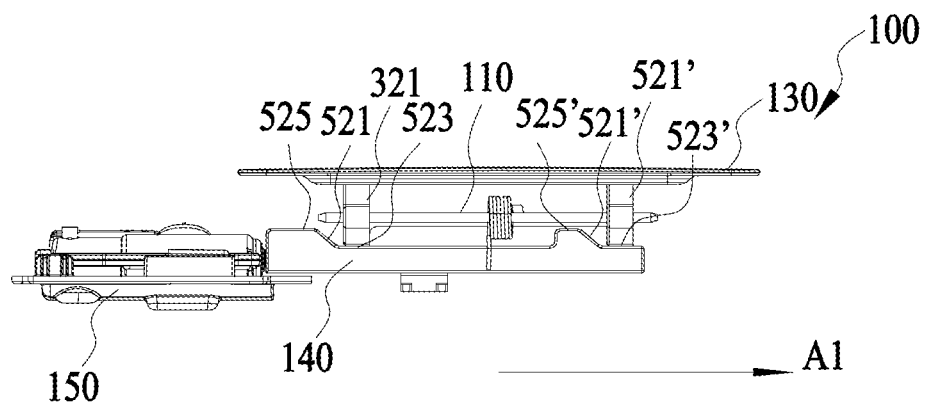
FIG. 6A is a top view of the door handle assembly in FIG. 1A when the handle is in a retracted position in which the handle holder is removed.
Figure 6B:
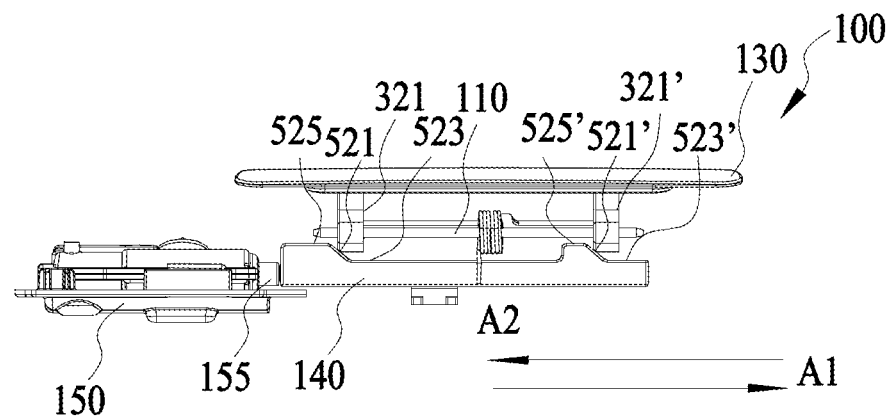
FIG. 6B is a top view of the door handle assembly in FIG. 1A when the handle is in a semi-deployed position in which the handle holder is removed.
Figure 6C:
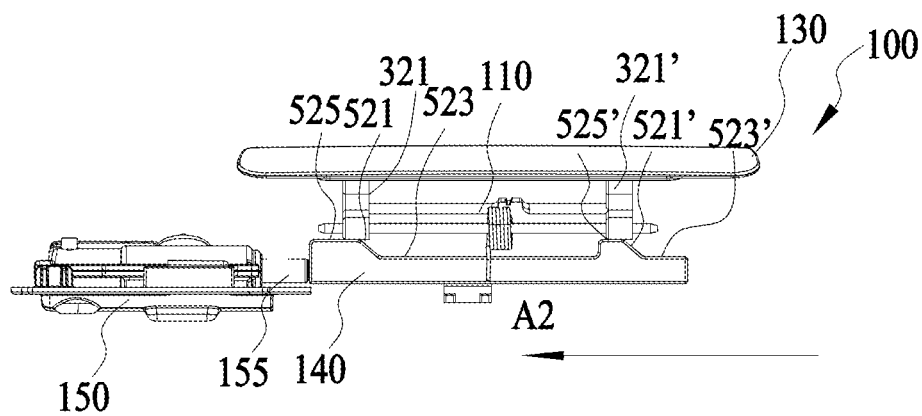
FIG. 6C is a top view of the door handle assembly in FIG. 1A when the handle is in a deployed position in which the handle holder is removed.
Figure 7:
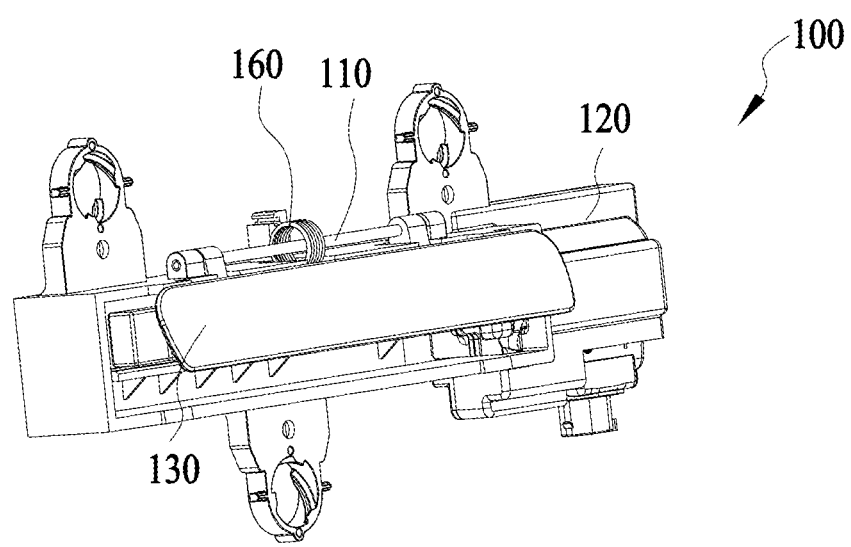
FIG. 7 is a perspective view of the door handle assembly in FIG. 1A when the handle is in a deployed position.

FIGS. 6A to 6C show the relative position relationship between various components of the door handle assembly 100 when the handle 120 is in different positions, and more specifically, show the position relationship between the slider 140 and the handle 130, wherein the handle holder 120 is removed for convenience of showing the slider 140 and the handle 130. FIG. 6A is a top view of the door handle assembly 100 when the handle 130 is in a retracted position, FIG. 6B is a top view of the door handle assembly 100 when the handle 130 is in a semi-deployed position, and FIG. 6C is a top view of the door handle assembly 100 when the handle 130 is in a deployed position. FIG. 7 shows a perspective view of the door handle assembly 100 when the handle 130 is in a deployed position.

As shown in FIG. 6A, when the slider 140 has not yet been driven by the actuator 150, the slider 140 is in its initial position and has not yet moved forward along the first direction A1, and the handle 130 is also in its initial position, i.e., a retracted position. At this time, the connecting arms 321, 321' of the handle 130 abut against the release surfaces 523, 523' of the slider 140, but have not yet started to contact the driving surfaces 521, 521' of the slider 140. As shown in FIG. 6B, when the actuator 150 receives a signal indicating operation start, the driving shaft 155 thereof is extended, and the slider 140 starts to move along the first direction A1 under the drive of the driving shaft 155 of the actuator 150.

As the slider 140 moves along the first direction A1, its driving surfaces 521, 521' abut against the connecting arms 321, 321' of the handle 130, and since the driving surfaces 521, 521' are inclined surfaces gradually raised with respect to the handle 130, the driving surfaces 521, 521' gradually push the connecting arm 321 of the handle 130 to move in the direction away from the slider 140, thereby enabling the handle 130 to be rotatable about the rotation shaft 110 with respect to the handle holder 120 towards a deployed position. In this process, the connecting arms 321, 321' of the handle 130 move along the driving surfaces 521, 521' from the lowest points to the highest points thereof until reaching the retaining surfaces 525, 525' that connect with the highest points of the driving surfaces 521, 521', as shown in FIGS. 6C and 7. After the connecting arms 321, 321' of the handle 130 abut against the retaining surfaces 525, 525' of the slider 140, the further forward movement of the slider 140 will no longer bring the handle 130 to rotate, and the handle 130 reaches its deployed position. When the handle 130 is in the deployed position, an operator may further make the handle 130 to deploy at a greater angle by pulling the handle grip portion 340 of the handle 130, thereby the components to which the handle 130 is connected, such as a cable, a microswitch, or a sensor (not shown in the figures), can be driven to open the vehicle door or a door lock. During the rotation of the handle 130 from the retracted position to the deployed position, the spring 160 is deformed under force.

When the actuator 150 receives a signal for stopping the operation, the driving shaft 155 thereof retracts and the slider 140 is pulled to move backward in the second direction A2. At the same time, the handle 130 is rotated from the deployed position towards the retracted position by the restoring force of the spring 160 because the handle is no longer subjected to the pushing force of the slider 140.

The door handle assembly according to the present disclosure achieves automatic extension and retraction of a concealed door handle with reduced components and a compact structure. Specifically, the door handle assembly of the present disclosure enables the handle to rotate about an axis extending along the length direction X of the vehicle, and employs a linear actuator and a slider that converts a linear driving force of the linear actuator into a rotational motion of the handle. The door handle assembly formed by these components together, compared with the door handle assembly using a flat push handle and the door handle assembly using a handle rotating about an axis in other directions, is capable of automatically extending and retracting the concealed door handle by using only a few parts and a compact structure. In addition, since the handle rotates about an axis extending along the length direction X of the vehicle (also the length direction of the handle), there is a space in which more than one handle connecting arm is provided, which enables the rotational motion of the handle more stable.

Although the present disclosure is described in conjunction with the examples of embodiments outlined above, various alternatives, modifications, variations, improvements, and/or substantial equivalents that are known or current or to be anticipated before long may be obvious to those of at least ordinary skill in the art. For example, although the door handle assembly in the above-described embodiments of the present disclosure has a pair of connecting arms, solutions employing more than one pair of connecting arms are also within the scope of protection of the present disclosure. For example, although a release surface and a retaining surface are arranged on the slider in addition to the driving surface in the above-described embodiment of the present disclosure, a solution in which the release surface and the retaining surface are not arranged is also within the scope of protection of the present disclosure. Furthermore, the technical effects and/or technical problems described in this description are exemplary rather than limiting; therefore, the disclosure in this description may be used to solve other technical problems and have other technical effects and/or may solve other technical problems. Accordingly, the examples of the embodiments of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements, and/or substantial equivalents.

I claim:

1. A door handle assembly for a vehicle, comprising:
a handle holder provided with a rotation shaft extending in a length direction of the vehicle;
a handle connected to the rotation shaft and configured to be pivotable about an axis of the rotation shaft to move between a retracted position and a deployed position;
a slider linearly movably arranged in the handle holder and configured to, by its forward movement in a first direction, bring the handle to rotate from the retracted position to the deployed position, and to be able to move backward in a second direction opposite to the first direction, so that the handle can rotate from the deployed position to the retracted position; and
an actuator configured to drive the slider to move forward in the first direction and backward in the second direction.

2. The door handle assembly according to claim 1, wherein the handle comprises a handle grip portion and a pair of connecting arms connected at a rear side of the handle grip portion, the handle grip portion being connected to the rotation shaft via the pair of connecting arms; and
wherein the slider comprises a pair of driving surfaces provided on a front side of the slider, the pair of driving surfaces being configured to respectively drive the pair of connecting arms so as to rotate the handle from the retracted position to the deployed position.

3. The door handle assembly according to claim 2, wherein each of the pair of driving surfaces gradually extends away from the handle in the first direction.

4. The door handle assembly according to claim 3, wherein each of the pair of driving surfaces is an inclined surface.

5. The door handle assembly according to claim 2, wherein the door handle assembly further comprises a spring having a first end connected to the handle holder and a second end connected to the handle, the spring being configured to rotate the handle from the deployed position to the retracted position by a restoring force thereof.

6. The door handle assembly according to claim 5, wherein the handle further comprises a blocking piece disposed between the pair of connecting arms, wherein the second end of the spring is connected to the blocking piece.

7. The door handle assembly according to claim 5,
wherein the handle holder is provided with a guide groove therein; and
wherein the slider comprises a guide provided on a rear side of the slider, the guide being configured to be movable in the guide groove such that the slider is linearly movably provided in the handle holder.

8. The door handle assembly according to claim 7,
Wherein the handle holder is further provided with a supporting platform therein, the supporting platform being located below the guide groove and having a support surface extending substantially parallel to the guide groove to support the slider when the slider moves.

9. The door handle assembly according to claim 1, wherein the first direction and the second direction are parallel to the length direction of the vehicle.

10. The door handle assembly according to claim 1, wherein the actuator comprises a driving shaft, the driving shaft being connected to the slider to drive the slider to move forward in the first direction and backward in the second direction.

* * * * *